Figures 1, 2:
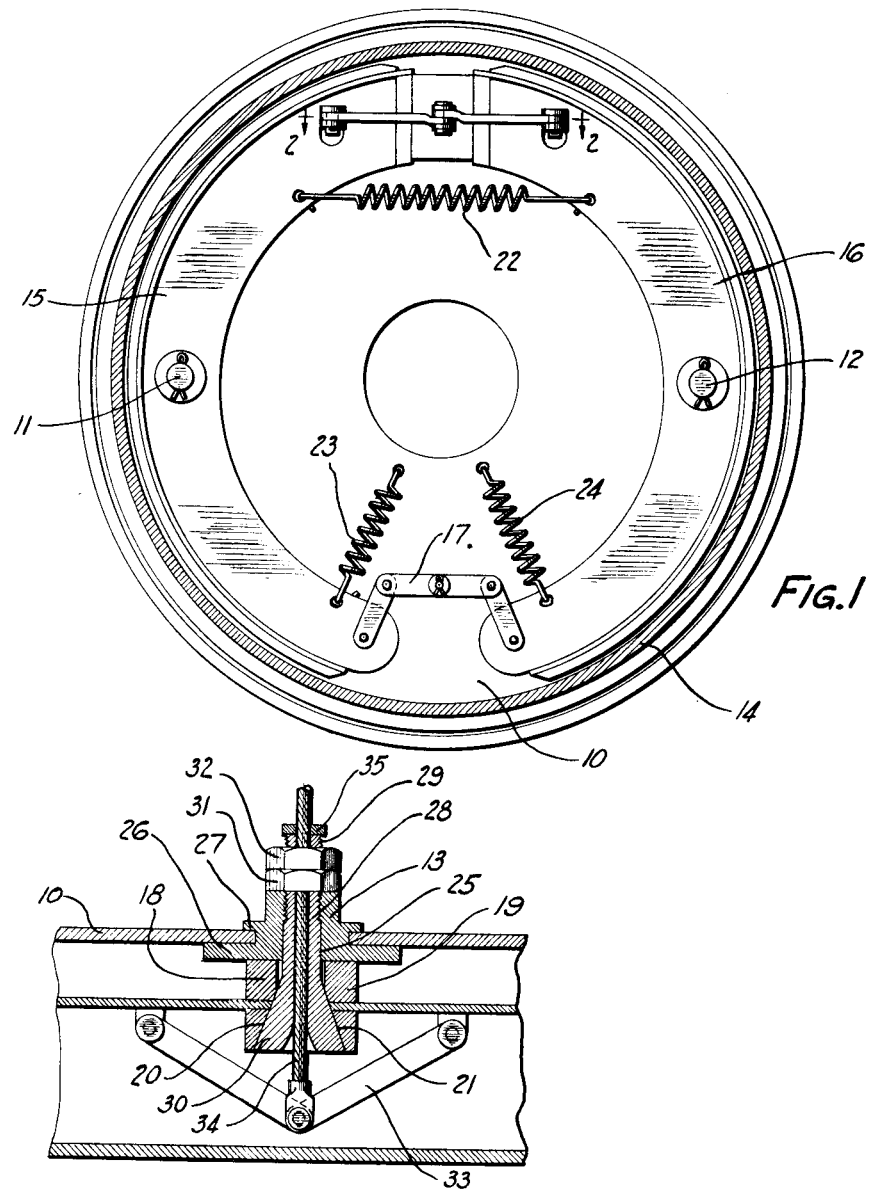

June 5, 1934.  W. L. KRIEG  1,962,081
BRAKE
Original Filed May 31, 1930

INVENTOR
WALTER L. KRIEG
BY
ATTORNEY

Patented June 5, 1934

1,962,081

UNITED STATES PATENT OFFICE 1,962,081

BRAKE

Walter L. Krieg, South Bend, Ind.

Application May 31, 1930, Serial No. 458,066
Renewed July 3, 1932

17 Claims. (Cl. 188—78)

This invention relates to brakes and more particularly to internal expanding brakes.

An object of the invention is to provide an adjustable anchor.

Another object of the invention is to provide an operating means for the friction elements of a brake of the internal expanding type.

Another object of the invention is to provide an adjustable anchor and an operating member co-operating therewith to expand the friction element of a brake.

Another object of the invention is to provide an adjustable anchor for a brake and operating means associated therewith, so arranged that upon adjusting the anchor, the operating means is adjustable simultaneously.

A further object of the invention is to provide an adjustable anchor and an operating means having a cable extending through the anchor and connected to friction elements, that portion of the cable connecting the anchor to the operating means being held under the tension.

Other objects and advantages of the invention will more fully appear in the following description taken in connection with the accompanying drawing which illustrates one embodiment thereof, and in which:

Figure 1 is a sectional view just back of the head of the drawing illustrating the friction elements in the elevation and showing the invention as applied, and Figure 2 is a sectional view substantially on line 2—2, Figure 1.

Referring to the drawing for more specific details of the invention, 10 represents a fixed support such as a backing plate having positioned thereon suitable steady rests 11 and 12 and an anchor 13. Associated with the backing plate 10 is a rotatable drum 14. This drum may be secured to a wheel not shown, in any suitable manner.

Positioned for movement on the backing plate 10 on the steady rests 11 and 12 is a primary shoe 15 and a secondary shoe 16. These shoes are connected to their articulated ends by a compound toggle 17, which permits relative movement between the shoes. The separable ends of the shoes are provided with shoulders 18 and 19.

As shown, the shoulders 18 and 19 are provided with inclined or bevelled faces 20 and 21 arranged in oppositely disposed relation with respect to each other, the object of which will hereinafter appear.

As shown, the primary shoe 15 and the secondary shoe 16 are connected by a coil spring 22 and the articulated ends of the shoes are connected by coil springs 23 and 24 to the backing plate. These springs serve to return the shoes to the off position and to retain them against the anchor 13, in proper spaced relation to the radius of the drum.

As shown, the anchor 13 comprises a sleeve 25 having a flange 26. The sleeve is positioned in an opening or aperture in the backing plate 10 and is sheared as indicated at 27 to securely fasten the sleeve within the opening. Positioned for movement within the sleeve 25 is a tubular member 28 externally threaded as indicated at 29 and provided with a wedge shaped portion 30. This tubular member has threaded thereon a nut 31 and a lock nut 32, the object of which will hereinafter appear.

The separable ends of the primary and secondary shoes 15 and 16 are connected by a toggle 33 to the knee of which is connected an operating cable 34. This cable extends through the sleeve 28 and has suitably secured thereon a washer or stop 35. This stop engages the outer end of the tubular member 28 and retains that portion of the cable extending from the outer end of the tubular member 28 to the knee of the toggle under tension.

In operation, the lock nut 32 is backed off and an adjustment effected by tightening up or backing off the nut 31. This moves the tubular member 28 inwardly or outwardly to effect a proper adjustment between the primary and secondary shoes. When movement is imparted to the tubular member 28, a corresponding movement is imparted to the cable 34, hence in adjusting the anchor a corresponding adjustment is effected on the separable ends of the friction element.

Although this invention has been described in connection with certain specific embodiments, the principles involved are susceptible of numerous other applications that will readily occur to persons skilled in the art. The invention is, therefore, to be limited only as indicated by the scope of the appended claims.

Having this described the various features of the invention, what I claim as new and desire to secure by Letters Patent is:

1. A brake comprising an anchor having a fixed sleeve, a member movable in the sleeve, means for securing the member in the sleeve, a wedge shaped portion on the member and a bore in the member having an operating cable therein.

2. A brake comprising a friction element having separable ends, a toggle connecting the separable ends, an anchor positioned between the separable ends, means for adjusting the anchor and an operating cable connected to the toggle and extending through the adjusting means.

3. A brake comprising a friction element having separable ends, an anchor positioned between the separable ends, means for adjusting the anchor, a toggle connecting the separable ends, an operating cable connected to the knee of the toggle and extending through the adjusting means and means connecting the cable to the adjusting means.

4. A brake comprising a fixed support, a sleeve positioned on the support, a member adaptable for movement in the sleeve having a wedge shaped end portion, means for regulating the position of the member, a friction element positioned for movement on the fixed support having separable ends, a toggle connecting the separable ends, a cable connected to the knee of the toggle extending through the adjustable member and means for maintaining the cable between the toggle and the member under tension.

5. A brake comprising a fixed support, a sleeve extending through the support, a circumferential flange on the sleeve bearing against the support, a member positioned for movement in the sleeve, means for regulating the position of the member, a friction element positioned for movement on the support, a toggle connecting the separable ends of the friction element, a wedge shaped portion on the member, bevelled shoulders on the separable ends of the friction element engaging the wedge shaped portion, an operating cable connected to the knee of the toggle extending through the member and means for connecting a cable to the member.

6. A brake comprising a fixed support, friction elements positioned for movement on the support having bevelled shoulders on their separable ends, an anchor having a wedge shaped portion positioned between the shoulders, a sleeve movably supporting the anchor, a toggle connecting the separable ends of the friction element, an operating cable passing through the anchor and connected to the knee of the toggle, means for adjusting the relative position of the anchor and means connecting the anchor to the cable.

7. A brake having an adjustable anchorage and applying means, including a part passing through the adjustable anchorage.

8. A brake comprising an anchorage including a movable wedge having an opening therethrough, and applying means including a part moving through the opening.

9. A brake comprising an anchorage including a movable wedge having an opening therethrough, and applying means including a tension element longitudinally movable through the opening.

10. A brake comprising an adjustable anchorage having an opening therethrough, an operating toggle, and a tension element passing through said opening and connected to the toggle.

11. A brake comprising an adjustable anchorage having an opening therethrough, an operating linkage, and actuating means passing through said opening and connected to the linkage.

12. A brake comprising an adjustable wedge, anchor blocks abutting the sides of said wedge and formed with guide slots, and friction means having parts received in said slots.

13. A brake comprising a backing plate having mounted thereon a central hollow boss and having side flanges, a wedge having a stem extending through said boss and provided with operating means on the stem engaging said boss, and guide blocks engaging opposite sides of the wedge and slidably engaging the side flanges.

14. A brake comprising a lengthwise-adjustable wedge having an opening therethrough, and operating means including a tension element movable lengthwise in said opening.

15. A brake comprising a pair of shoes, and a compound toggle connecting the shoes and including a transverse member centrally mounted on a fixed pivot and links connecting the ends of said member to the respective shoes.

16. A brake comprising a friction element having separable ends, a toggle connecting the separable ends, an anchor positioned between the ends, a cable associated with the anchor for actuating the toggle, and means for simultaneously adjusting the anchor and retaining the cable in substantially adjusted relation with the anchor and including a sleeve embracing and adjustable lengthwise of the cable.

17. A brake comprising a friction element having separable ends, actuating means for spreading said ends, an anchor positioned between the ends, a cable associated with the anchor for actuating said actuating means, and means for simultaneously adjusting the anchor and retaining the cable in substantially adjusted relation with the anchor and including a sleeve embracing and adjustable lengthwise of the cable.

WALTER L. KRIEG.